US 8,762,723 B2

(12) United States Patent
Yu et al.

(10) Patent No.: US 8,762,723 B2
(45) Date of Patent: Jun. 24, 2014

(54) CRYPTOGRAPHIC SECURITY USING FUZZY CREDENTIALS FOR DEVICE AND SERVER COMMUNICATIONS

(75) Inventors: Meng-Day Yu, Fremont, CA (US);
Srinivas Devadas, Lexington, MA (US);
David M'Raihi, San Carlos, CA (US);
Eric Duprat, Los Altos, CA (US)

(73) Assignee: Verayo, Inc., San Jose, CA (US)

( * ) Notice: Subject to any disclaimer, the term of this patent is extended or adjusted under 35 U.S.C. 154(b) by 0 days.

(21) Appl. No.: 13/543,295

(22) Filed: Jul. 6, 2012

(65) Prior Publication Data

US 2013/0010957 A1    Jan. 10, 2013

Related U.S. Application Data

(60) Provisional application No. 61/505,452, filed on Jul. 7, 2011, provisional application No. 61/599,515, filed on Feb. 16, 2012.

(51) Int. Cl.
*G06F 21/00*    (2013.01)

(52) U.S. Cl.
USPC ........................................... 713/169

(58) Field of Classification Search
None
See application file for complete search history.

(56) References Cited

U.S. PATENT DOCUMENTS 4,947,430 A * 8/1990 Chaum ..................... 713/180
2012/0131340 A1* 5/2012 Teuwen et al. ............ 713/168

FOREIGN PATENT DOCUMENTS

| EP | 2 230 794 | 9/2010 |
| WO | WO 2008/004174 | 1/2008 |
| WO | WO 2009/146729 | 12/2009 |

OTHER PUBLICATIONS

International Search Report for PCT Application No. PCT/US2012/045735, mailed Mar. 6, 2013 (3 pages).

* cited by examiner

*Primary Examiner* — Izunna Okeke
(74) *Attorney, Agent, or Firm* — Occhiuti & Rohlicek LLP

(57) ABSTRACT

An approach to cryptographic security uses a "fuzzy" credential, in contrast to a "hard" credential, to eliminate cryptographic algorithmic repeatability on a device that may be subject to physical attacks. By eliminating repeatability performed at an algorithmic (e.g., gate or software) level, a device inherently lacks one of the fundamental setup assumptions associated with certain classes of side channel, fault injection, timing, and related attacks, thus helps to protect the system against such attacks while preserving the cryptographic security of the system.

16 Claims, 2 Drawing Sheets

CRYPTOGRAPHIC SECURITY USING FUZZY CREDENTIALS FOR DEVICE AND SERVER COMMUNICATIONS

CROSS-REFERENCE TO RELATED APPLICATIONS

This application claims the benefit of U.S. Provisional Application No. 61/505,452, filed Jul. 7, 2011, titled, "Cryptographic Session Key Exchange Without a Device Root Key," and of U.S. Provisional Application No. 61/599,515, filed Feb. 16, 2012, titled, "Cryptographic Security Using Fuzzy Credentials for Device and Server Communications," which are incorporated herein by reference.

BACKGROUND

This invention relates to enhancing the cryptographic security of communications between a device and a server using "fuzzy" credentials derived from physical unclonable functions (PUFs) or other noisy pseudo-random sources associated with a device.

Communications between a "device" and "server", in the broad sense, is a commonly used construct. This can include communications between a computing client and a cloud server, between a smart card and an application processor, between a device module and a server module both integrated inside a system-on-a-chip, between a computing peripheral and a computing box, between two secure elements where one serves as the device and the other the server, or between two entities with a similar slave and master relationship, to name a few.

To achieve cryptographic security in such a communication using conventional methods, it is generally necessary to use a cryptographic algorithm and a "hard" credential. By hard credential, we refer to a piece of information that is repeatedly bit-exact.

For example, a user name and password is used to log into a banking website. In this case, the user's computing entity is the "device", and the banking website is the "server". The device logs into the server uses a "hard" credential consisting of username and password. The device has the server's public key. The server has to keep its private key secret.

We note that if the user login is to be automated in a secure fashion, the computing entity needs to store the username and password using another "hard" credential (for example, a cryptographic key) to encrypt that information.

The username and password can also be replaced with a biometric reading and a syndrome to error correct the biometric reading into a previously provisioned value. The error corrected biometric reading is also a "hard" credential in that it is repeatedly bit-exact.

In another example, a smart card in a set-top box ("device") can communicate with a content distributor ("server") if each possess the other's public key, and each keeps its private key secret. The private key is a "hard" credential in that it is repeatedly bit-exact.

There are several consequences associated with the use of "hard" credentials in the context of cryptographic algorithms. For example, when a cryptographic key is used with the AES algorithm, the setup is subject to side channel attacks (P. Kocher, J. Jaffe, B. Jun, "Differential Power Analysis," Lecture Notes in Computer Science, vol. 1666, pp. 388-397, 1999) where an adversary with access to plaintext/ciphertext pairs and power traces associated with these pairs can use statistical correlation analysis to reduce (e.g., linearlize) the exponential key search space by a divide and conquer approach. Due to the cryptographic nature of the algorithm (e.g., its confusion, diffusion characteristics), if a DPA hypothesis for a key-related value is correct, there will be a sharp correlation spike; if not the correlation will be relatively flat. This behavior again (the sharp correlation spike) is due to the fact that the algorithm is cryptographic (has confusion, diffusion characteristics) and the key is repeatedly bit exact (i.e., a "hard" credential). This class of attacks also apply to asymmetric algorithms (extract a device root key in the form of a private key of a key pair) or key derivation functions (to extract a device root key in the form of a symmetric key used to derive session keys, or used to form a challenge/response mechanism associated with the device).

One typical task in which conventional cryptographic techniques are used is mutual authentication and secure communication between two parties, for instance, between a server and a remote device. By being mutually authenticated, each party can rely on the identity of the other party in the communication, and can assure itself that it is not communicating with an imposter. By secure communication, each party can rely on the communication between the two parties not being accessible by other parties, that can, for instance, overhear the communication.

One conventional way to implement this task is for the device to have encoded in it a "device root key," for example, a private key of a public-private key pair. In some examples, the server has a copy of the corresponding public key, that it trusts as truly corresponds to the device root key. In this way, the device can perform cryptographic functions, such as cryptographic signature or decryption, using the device root key (more generally, separate device root keys can be used for different functions, one for signing, and another for decryption), and the server can examine the product of such functions to determine whether the correct device root key was used. In this way, the server can authenticate the device as a party that holds the device root key. However, it should be evident that if the device root key is disclosed to other parties, those other parties can become imposters for the true device. Similarly, the server can securely pass information to the device in a way that only a holder of the device root key can access. In the reverse direction, if the device trusts a copy of the server's public key, the device can authenticate the server and can pass information to the server in a secure manner. In some examples, the information that is exchanged is a session key or a quantity used to generate a session key, and the session key is used to exchange further information.

SUMMARY

In one aspect, in general, a new approach uses a "fuzzy" credential, in contrast to a "hard" credential, to eliminate cryptographic algorithmic repeatability; this setup, by eliminating repeatability performed at an algorithmic (e.g., gate or software) level, inherently lacks one of the fundamental setup assumptions associated with certain classes of side channel attacks such as DPA, fault injection, timing attacks, to name a few, thus helps to protect the system against such attacks while preserving the cryptographic security of the system (the same cryptographic hardness problem and information theory constructs are the basis of security).

Another consequence associated with the use of hard credentials, in the form of a cryptographic key, is associated with invasive or semi-invasive probing of the system. The cryptographic key can be stored in non-volatile secure memory on the device. If an adversary is able to probe the memory bits, for example via delayering of the device and physically observe the states of the memory, the key is cloned and security is compromised. The cryptographic key can also be attacked at a location downstream from the secure memory, for example, while it is being used by an AES encryption engine by probing the registers or buses inside the engine and working backwards to infer the a key associated with a key schedule. Alternatively, intermediate results can reside in dynamic memory, and these values and persist for a long time if the device is frozen and then observed; alternatively these values may imprint in the memory causing its threshold voltage to shift and that can be observed by an adversary. Alternatively, the cryptographic key can be generated from a biometric reading or from a PUF (instead of storing the key), with the aid of error correction to arrive at a repeatedly bit-exact value. Such a system is still subject to "downstream" attacks as described above.

In some aspects, the new approach uses "fuzzy" credentials to help address the probing attacks described above. In the "hard" credential case, a fix-length bit sequence is the goal of the extraction. When a "fuzzy" credential is used in the context of a computationally large number of challenge/response pairs, the bit sequence observed is different for every transaction. The value observed is particular to a specific session. To succeed in a probing attack, instead of extracting a fix-length bit sequence (i.e., the repeatedly bit-sequence that forms the hard credential), the challenge/response characteristic of a physical noisy pseudo-random system needs to be reverse engineered, which requires additional efforts beyond a success in bus, memory, or register probing.

The use of fuzzy credentials in the context of device and server communications can be used for device authentication, cryptographic session key exchange, and other cryptographic communications without a "hard" credential to protect on the device. Additionally, the present invention can be used to distribute, authenticate, and update "hard" credentials (e.g., traditional cryptographic keys) on the device. Since the use of fuzzy credential is more secure than storing or generating a hard credential (key), the scheme can be used as a key distribution mechanism, to authenticate device root keys, to detected cloned device root keys, to re-provision or update keys, and to update firmware and software. It can also be used in certain use cases to create a relatively lightweight but secure device where there is no device root key to protect on the device.

Cryptographic security using fuzzy credentials can be realized using PUFs. The PUF, however, has to be used in a construction (to be described later in this filing) that is different than its two common use cases. To appreciate this difference, we now describe the two classes of applications commonly associated with PUFs.

A first class of application is PUF-based authentication based on hamming-distance compares. Here, PUF response bits are used in their "fuzzy" form—they are not error corrected; the security of such a system, when associated with a computationally large number of challenge/response pairs, relies on an assumption that a PUF is difficult to reverse-engineer (i.e., a PUF modeling assumption) when it is treated as a black box that is available to an adversary. Such an assumption may or may not be suitable for applications that require cryptographic-grade security. For example, in U.S. Pat. Pub. 2010/0127822, titled "Non-Networked RFID PUF Authentication," the device uses the PUF to generate a response to the challenge, and the server has a model of the PUF with which to verify that the generated response matches a modeled response sufficiently well.

A second class of application is PUF-based key generation. Here, PUF responses are used in a repeatedly bit-exact form. By using error correction to correct the "fuzzy" PUF response to a repeatable string of bits that is unique to a device, a PUF-derived value can be used to derive a repeatable bit-exact cryptographic key. The security of such a system no longer has to rely on a PUF modeling assumption. Instead, the security can be reduced to cryptographic or information theoretic assumptions that more consistent with cryptographic-grade applications. For example, U.S. Pat. No. 7,818,569, titled "Data protection and cryptographic functions using a device-specific value," includes a description of such a use of a PUF. As an example, a key generation function is applied to determine a cryptographic key with an input to the function being an output of a silicon PUF. This approach does not require storing of the input or the key in a non-volatile storage. In some examples, for example as addressed in U.S. Pat. No. 7,681,103, titled "Reliable Generation Of A Device-specific Value," redundancy information is used on a device to regenerate a previous output of a PUF so that it matches, for instance by using an error correcting code to map the output of the PUF to the previous output without deviations in any of the bits.

As described, the fuzzy use of PUF responses in PUF-based authentication, when associated with a computationally large number of challenge/response pairs, has a security argument that relies on a PUF modeling assumption, which may not be suitable for cryptographic-grade applications. By contrast, the repeatable and bit exact use of PUF responses in PUF-based key generation can be used in a manner that relies on cryptographic or information theoretic assumptions that more consistent with cryptographic-grade applications. The present invention achieves the latter (security based on cryptographic or information theoretic assumptions) by using the fuzzy, un-error-corrected PUF responses as a fuzzy credential to perform functions such as cryptographic-grade authentication and cryptographic session key exchange.

There are several benefits of using fuzzy credentials to achieve cryptographic-grade security.

An error correction block becomes optional, reducing complexity of the system.

The use of fuzzy credentials results in greater immunity against certain classes of side channel attacks a PUF device. Side channel attacks such as Differential Power Analysis (DPA) or fault injection attacks often relies on cryptographic algorithmic repeatability. By constructing a cryptographic-grade system using fuzzy PUF credentials, a system can be constructed where certain classes of transactions (for example, device authentication, session key exchange, key updates) do not rely on a repeatable string of bits (e.g., device root key) for security, and thus lacks the cryptographic algorithmic repeatability that is often taken advantage of in certain classes of side-channel attacks.

As another example, the use of fuzzy credentials results in greater immunity against invasive attacks on a PUF device. To succeed in an invasive attack of a system with fuzzy credentials and a computationally large number of challenge/response pairs, the adversary has to literally reverse-engineer the challenge/response characteristics of a physical system. This is more difficult than invasively probing the device to extract a repeatable string of bits (device root key) stored using non-volatile memory or generated using a PUF.

The use of PUF responses as "fuzzy" credentials in a manner which achieves cryptographic-grade security (from a formal, provable perspective) thus as advantages over cryptographic-grade security achieved using PUF-based Key generation or other methods that rely on a repeatedly bit-exact string of bits. The fuzzy credential allows the construction of systems and protocols that helps to address certain classes of inference attacks as well as direct attacks.

In another aspect, in general, an approach to mutually authenticated secure communication does not require non-volatile storage or generation of a root key at a device. In some examples, the server has a private key and the device has a trusted copy (or can obtain such a copy) of the server's public key. This alone is sufficient for the device to pass information securely to the server knowing that no other party other than the server, or another party with access to the server's private key, can have access to the information. On the other hand, rather than having the device store or regenerate (e.g., using a PUF) a device root key so that it can securely receive information from the server, or so the server can authenticate the device, the device makes use of a PUF directly (for example, without requiring error correction to derive a stable bit sequence to generate a key) to perform various security functions.

In some examples, a session key is generated at a device based on a PUF output (which may be a challenged PUF output, for example, using a challenge value generated partly by each of the device and the server). The PUF output is securely provided from the device to the server, for example, encrypted using the public key of the server known and trusted by the device. The server authenticates the device for the duration of the use of the session key by comparing the PUF output to an expected PUF output, for instance, based on a trusted parameters or model of the PUF held by the server. The device and the server both generate the session key based on the actual PUF output, and communicate for some time, for example, until the session key needs to be renewed. The session key is renewed with very little secret computations (e.g., session key derivation from a device root key; error correction) being performed at the device.

In another aspect, in general, a secure communication session is established between two devices by generating a first part of a challenge value at a first device, and generating a second part of the challenge value at a second device. The first part and the second part of the challenge are exchanged between the first device and the second device by encrypting the first part for decryption at the second device and signing the second part for signature verification at the first device. This is followed by determining at the first device if the signed second part has a valid signature of the second device. The challenge is used at the first device as an input to a physical unclonable function element to form a response that is characteristic to the first device, and the response is passed in an encrypted form to the second device. Then, the second device determines if the response passed from the first device sufficiently matches a predicted response of the unclonable function element. Matching communication key are then generated at each of the first device and the second device based on the response of the physical unclonable function element.

In one specific example, the following exchanges are used to generate a session key assuming that the device holds a trusted copy of the server's public key and the server holds a trusted parameter or model of the device's PUF:

A) Nonces $N_{DEV}$ and $N_{SRV}$ are exchanged between the devices. The former is encrypted in a way that requires the server's private key to decode, and later is signed by the server in a manner that a recipient can authenticate the server as having provided it. The device and server each form the challenge value as $N=N_{DEV}\|N_{SRV}$. Note that all the computations performed by the device are public (i.e., signature verification and encryption both uses public keys on the device; public computations are easier to protect than secret computations on the device).

B) The device generates a PUF response R based on the challenge N, and the server generates a modeled response R' based on the parameters or model of the PUF and the same challenge. Other than random variation, the responses should be very similar of the device is authentic and quite different if the device is not authentic.

C) The device sends R to the server encrypted in a form that requires the server's private key to decode.

D) The server compares R with R' to see is it sufficiently matches for the device to be declared authentic.

E) Each party generates the session key K that is at the minimum a function of PUF response R (and more generally be a function that also incorporates the Nonces as well as other values), which is exactly known to both parties.

F) The parties communicate using the session key K.

The server and device each knows that for an adverse party that overheard the exchange to be able to access the information encrypted using the session key K, the adverse party would have to know both the private key of the server and the parameters or model of the device's PUF. Furthermore, the server knows the communication is authentic because the device was able to provide the PUF response that matched the parameter or model, and the device knows the server is authentic because the quantities $N_{DEV}$ and R were provided such that only a holder of the server's private key (and the model of the device's PUF) could generate session key.

In some examples, a device is configured with a device root key, and cryptographic procedures (e.g., signing and/or encryption) make use of the key. Nevertheless, another party may wish to authenticate the validity of the root key and renew the root key, for example, on a schedule or if the root key may have been compromised.

As an example, renewal of a device root key involves establishing a secure communication between the device and the party wishing to renew the root key. Then, the new root key is transferred to the device. Similarly, each of a number of parties can establish their own root key with the device as long as these parties have access to the trusted model or parameters of the PUF on the device.

In some examples, the session key is used to establish the secure session with the device, and further communication over the secure session is used to further establish authenticity, for example, by using the PUF with further challenges. In this way, these further exchanges are protected from being intercepted or tampered with by adverse parties, thereby increase the protection of the PUF itself, for example, from modeling attacks.

Advantages can include one or more of the following.

Establishing a session key requires relatively little computation at the device. For example, as compared to using a PUF to generate a key to sign or encrypt a session key generated by the device, the approach does not require reliable regeneration of an exact device root key or temporary storage of the device root key between generations of session keys.

There are at least two ways the reduced computations provide an advantage. First, less computation inherently requires fewer resources (e.g., circuit area, processing time, power requirement etc.). Second, less computation that involves repeated use of the same sensitive information provides less opportunity for attack, for example, using side-channel techniques such as differential power analysis. To the extent that sensitive information must be processed on the device, a related advantage is that additional resources are not required to protect that information during processing.

In some examples, not having to protect error correction processing of a PUF output provides an advantage that can be realized. There is no error correction algorithm to attack (or protect). There is no session key derivation function (deriving session key from device root key) to attack (or protect). There is no string of repeatable bits (i.e., device root key) to attack on the device to clone the device; instead the challenge/response characteristics of a physical system needs to be modeled when attacking the device to clone the device.

In general, avoiding use of a root key, whether stored or regenerated with error correction, offers protection of downstream logic since the session key is derived from a physical function (without a device root key), and not derived from a string of repeated bits which necessitates cryptographic algorithmic repeatability. In conventional approaches, the repeated use of a device root key can require adding protection for downstream logic in a manner that is not required when the invention is used. In a properly designed implementation, all the "keyed" computations in the present invention use public keys. Private key computations can be added but is not required. Public key computations require less protection than private key computations.

Furthermore, all or most cryptographic computations on the device are public (e.g., use public keys), thereby being easier to protect. Successful extraction of values used on these computations does not allow spoofing of future transactions, unless the adversary succeeds in the reverse engineering of the challenge/response characteristics of a physical system tied to the device. By contrast, with schemes using a device root key, successful probing or extraction of values (at the PUF output or in parts of the downstream cryptographic logic) readily results in the cloning of the device.

Note that the parameters or the model can be signed and encrypted and stored back on the device to help protect against security breaches at the server where a server database is stolen. In some examples, the signed and encrypted model or parameters are fetched when a device root key (previously provisioned) needs to be authenticated and updated, and for performing security updates (e.g., over a secure session established using a session key as outlined above).

The approach can support a key distribution and security update mechanism because both can be performed without the reliance on an uncompromised device root key. Instead, the manufacturing variations (and more specifically physical challenge/response characteristics) are used. This is perhaps the first scheme known to date where electronic remote "over-the-air" secure updates of device root keys are possible even all device root keys on the device has been compromised. (This assumes that the manufacturing variation characteristics represented in the model or parameters of the PUF, from which challenge/response pairs can be determined, have not been compromised.) Key distribution and security updates thus relies on a physical characteristics of the device, which provides a lower (physical) layer of security that can be used to authenticate and update device root keys.

The approach can have a higher level of resistance to invasive attacks. In a traditional scheme, the downstream logic that use the device root key needs to be protected from snooping, since obtaining those values will allow cloning of the device. In the present scheme, even if the adversary successfully probes the downstream logic, without reverse-engineering the challenge/response characteristics of the physical system, the value obtained by the adversary cannot be used to spoof subsequent transactions.

The approach can also offer a higher level of resistance of side-channel attacks. In Differential Power Analysis, cryptographic keys can be extracted by performing statistical analysis of repeatedly used keys and repeated algorithmic computations. The approach can have native protection against certain classes of attacks at a structural level because repeatable cryptographic algorithmic steps are not used to derive session keys from the same device root key.

An important application of the approaches outlined above concerns methods to distribute such a device root key (i.e., to perform key distribution), to authenticate device root keys to distinguish between genuine vs. cloned devices containing cloned root keys, to perform security updates on genuine devices of device root keys and of software/firmware/bootloader that may have caused the breach, without a full reliance on an uncompromised device root key. Instead, the security for authentication and secure channel establishment is rooted in the challenge and response characteristics of a physical system, as opposed to a string of repeatedly stored/generated bits (i.e., the device root key).

In some applications, the task of device cloning now requires reverse-engineering the challenge and response characteristics of a physical system, and not merely the extraction of a repeated string of bits. Cryptographic functions that are downstream from the device root key are also more immune to attacks as a result. With a device root key, invasive probing of downstream cryptographic functions may yield the device root key. Using the present invention, such a probing attack (without a full reverse-engineering of the physical challenge/response system) only yields information that is good for that one particular session, and not subsequent cryptographic sessions.

In some applications, the scheme allows the device to log into the server using challenge/response pairs that are physically evaluated, akin to username/password login of a human-being into a server.

Other features and advantages of the invention are apparent from the following description, and from the claims.

DESCRIPTION

Figure 1A:
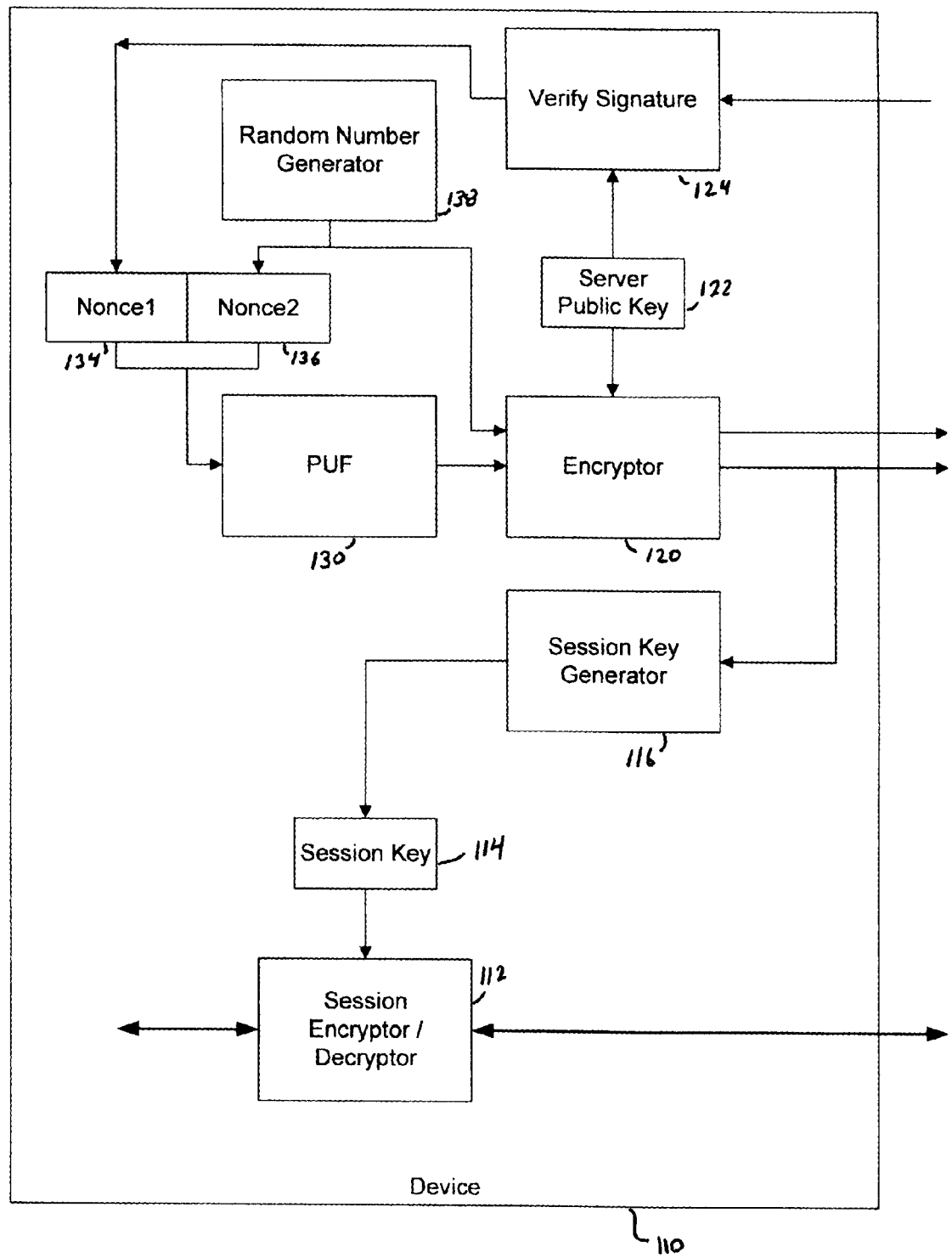
FIGS. 1A and 1B are a block diagram of an embodiment of a system in which a session key is generated without use of a device root key.
Figure 1B:
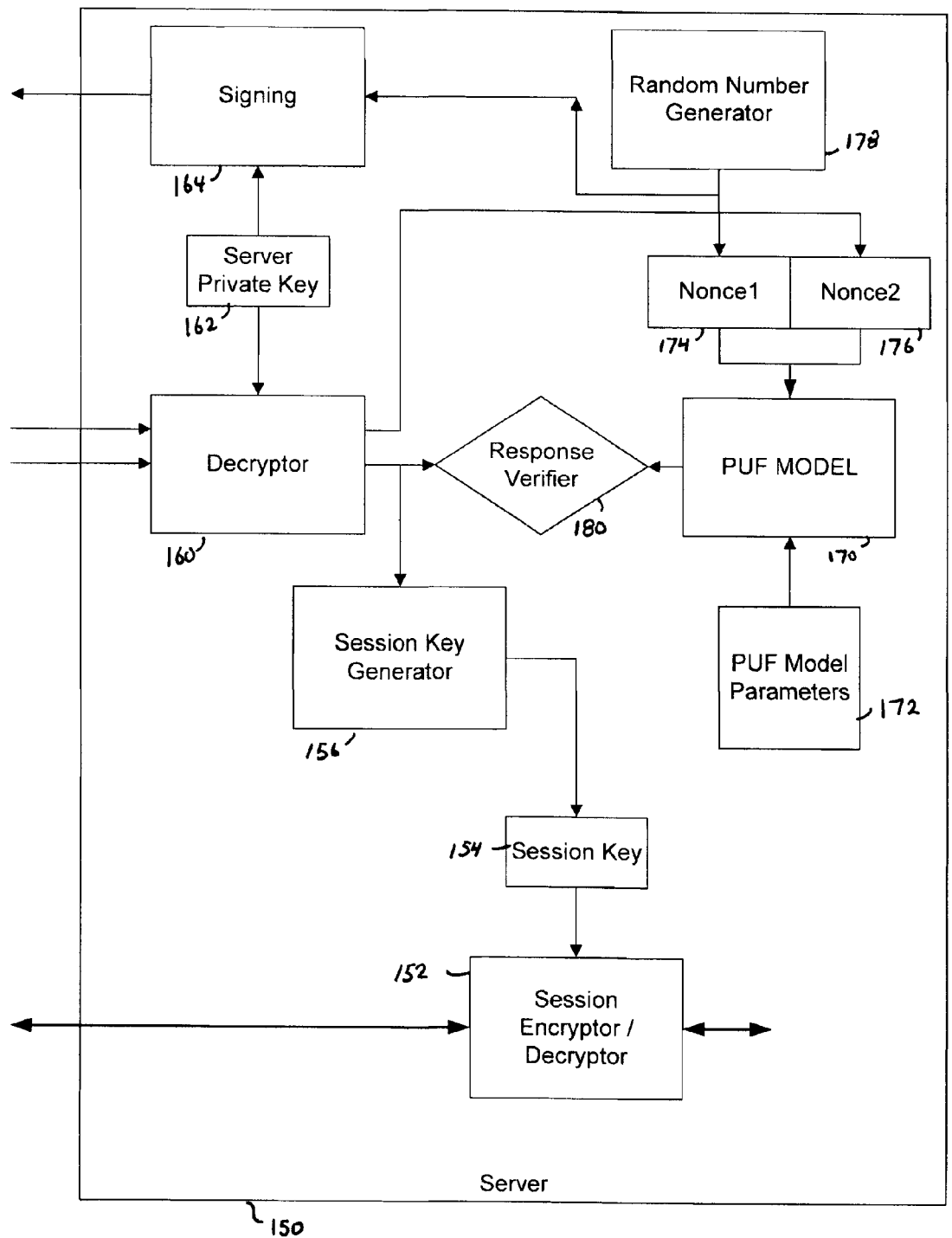

Referring to FIGS. 1A and 1B, a device 110 is configured to establish a secure communication session with a server 150. The device 110 relies on a Physical Unclonable Function (PUF) 130, which is a module that accepts a challenge input, and outputs a function of that challenge. The mapping from input to output (i.e., from challenge to response) is unique to the device (or more generally, unique to the user, device, or user-device combination). In some implementations, the PUF is implemented as part of an integrated circuit, and the uniqueness of the mapping arises at least in part from fabrication variation. For example, different instances of the PUF circuit on different semiconductor wafers or at different locations on a wafer have different mapping characteristics. Various silicon PUF implementations are described in one or more of the following patents and patent publications: U.S. Pat. No. 7,904,731; U.S. Pat. No. 7,564,345; U.S. Pat. Pub. 2007-0250938; U.S. Pat. Pub. 2009-0083833; and U.S. Pat. Pub. 2010-0127822; which are incorporated herein by reference. It should be understood that it is not required that the PUF be implemented entirely in silicon. For example, PUFs that rely on biometric input, for example, combining device characteristics and characteristics of a particular human subject (e.g., retina or fingerprint patterns) can be used in the techniques described below.

The server 150 relies on a model 170 of the device's PUF, which is generally configured according to numerical parameters 172. For example, in circuit-delay based PUFs, the numerical parameters may represent delay values of different circuit components. Various approaches to providing the server 150 with these models or parameters are discussed later in this Description. Note that the server trusts that the model and parameters are truly associated with the device. For example, if an adverse party substitutes the parameters for an imposter device, then the server may not be able to determine that a device it is communicating with is an imposter. Similarly, the server keeps the parameters private because if the parameters have been disclosed to an adverse party, that party may be able to clone the true device in such a way that the server cannot tell whether it is communicating with the true device or a clone.

Prior to the sequence of exchanges described below, the device 110 is assumed to have obtained a stored trusted copy of a server public key 122, and the server 150 is assumed to have obtained a trusted private copy of model parameters 172 of the PUF 130 at the device.

The key exchange procedure may be initiated by either the device or the server. For example, the device may initiate the procedure by using a random number generator 138 at the device to generate a nonce 136, which is a random number that will be used once in the procedure. The device keeps a temporary copy of the nonce, and applies a public key encryptor 120, using the server's public key 122, to encrypt the nonce. The encrypted nonce is sent to the server 150.

At the server 150, a decryptor 160 accepts the encrypted nonce and using the devices' private key 162, determines the nonce generated at the device and stores a temporary copy 176, which is identical to nonce 136 temporarily stored at the device. The nonce received from the device and the nonce generated at the server are concatenated (or otherwise combined) to form a combined nonce. Note that the encrypted nonce may be sent with other information, which may be encrypted as well. For example, the transmission may be request message to establish the secure communication message, and may include an identifier of the device and/or an identifier of the server. The procedure does not require that this nonce be kept secret. Even if it is intercepted, the overall procedure remains secure. There may be other contents (e.g., identifiers of the device) that may be useful to be kept secret for privacy reasons, so the device nonce might as well be encrypted before sent to the server.

The server 150 applies a random number generator 178 to generate a nonce 174. The server applies a signing module 164, configured by the server's private key 162, and sends the signed nonce to the device.

At the device 110, the signed nonce is received, and the signature is verified in a signature verifier 124, which is configured using the server's public key 122. (We note more generally multiple public keys can be used, e.g., one for signature verification, one for encryption.) If the signature is not valid, the procedure is terminated by the device. For example, an invalid signature could represent a substitution or attack by a party in the middle of the server to device communication path.

Assuming that the device verifies the server's signature, the device combines the nonce received from the server and the nonce generated at the device in the same manner as they are combined at the server, thereby forming the same combined nonce that has been formed at the server. We note that full adversarial knowledge of both parts of the nonce does not compromise security. Also the two-part formation of the full nonce forms a full key exchange (as opposed to a half key exchange) where both sides contribute a random part for the exchange, to prevent a single side, potentially maliciously controlled, from fully de-randomizing the key exchange. The server's signed nonce forms one side of the mutual authentication (server authenticated by the device). Later we shall describe how device gets authenticated by the server, where the device generates a PUF response using a physical PUF, and the server verifies the PUF response using an emulated/odeled PUF.

The device uses the combined nonce 134, 136 as the challenge input to the device's PUF 130, and the result is passed to an encryptor 120 configured with the server's public key. This computation is public, using a public key. Public key encryption requires less resource than private key encryption (e.g., smaller exponent size). In fact, all computations on the device so far are public; there is no (asymmetric) private key operation or (symmetric) secret key operations, in contrast with conventional mutually authenticated key exchange schemes. There is no device root key or repeated string of bits that need to be protected. Public computations are simpler to protect than private computations. Also note that the random nature of the combined nonce avoids generating the same PUF output on the device on different runs of the procedure.

The device sends the encrypted PUF response output to the server, which decrypts the device PUF output.

At the server 150, the server uses the combined nonce as input to the model 170 of the device's PUF, configured with the parameters 172 for the device, and generates a model PUF response output. In general, the model PUF response output will differ from the device PUF response output. However, if the outputs are sufficiently similar, there is a very high likelihood that the device PUF generated the device PUF output, and not an imposter of the device. A response verifier 180 compares the device PUF output with the model PUF output and determines if they are sufficiently similar. If they are not, the server may abort the procedure, or may request that the process be restarted with new nonce values.

At this point, both the device and the server have the same device PUF output. The device applies a session key generator 116, which is generally a one-way function, for form the session key 114. The server applies its copy of the session key generator 156 to generate the session key 154, which is identical to the session key generated by the device.

The device and the server now communicate using the session keys and session encryptor/decryptors 112, 152.

Note that the procedure described above is initiated by the device. The procedure can also be initiated by the server by sending the signed server nonce, and the device in exchange sending device nonce.

In some examples, the session key is renewed periodically. In some such examples, the nonces may be exchanged as described above. In some examples, the subsequent nonces are exchanged over the secure session.

In some uses, the session secured by the session keys is used to exchange further cryptographic information. One particular such exchange is used to update a root key for the device, which is used to secure other communication sessions, to update the server public key, key distribution and key management, etc.

In some examples, the model or parameters for the device's PUF are kept in a database that is accessible to the server. In other examples, the parameters are kept in encrypted form on the device, for example, encrypted in a manner decrypt-able by the server and optionally signed in a manner verifiable by the server. The encrypted/signed model or parameters is transferred to the server so that it can generate the model PUF response. Model parameters may be derived in an enrollment phase in which raw PUF outputs (e.g., PUF values that are generally internal to the PUF) are provided to an enrolling entity, which performs a computation to estimate the model parameters.

Although described above in the context of a device (e.g., a user's mobile cellphone) and a server (e.g., an application server accessible over the Internet), analogous exchanges may be performed in a number of different applications. For example, the device/server pair may be a secure computer processor/peripheral or storage device pair, and the secure session is internal within a computing device (e.g., over a PCI interconnect). In such an example, there does not have to be a device root key on the device to attack.

In some examples, the process may be stopped before generating the session keys. At that point, the device and the server have mutually authenticated each other.

Embodiments of the approaches may be implemented in software, stored on tangible machine-readable media, that includes instructions for causing a processor to some or all of the procedures described above. Some embodiments use a combination of hardware (e.g., application specific integrated circuits (ASIC), field programmable gate arrays (FPGA)) and software. In some examples, data stored on a tangible machine-readable medium includes instructions and/or data that impart functionality to a circuit design or layout system, for example, including a hardware description language (HDL, e.g., Verilog) representation of circuitry that performs some or all of the procedures or functions described above.

It is to be understood that the foregoing description is intended to illustrate and not to limit the scope of the invention, which is defined by the scope of the appended claims. Other embodiments are within the scope of the following claims.

What is claimed is:

1. A method for establishing a secure communication session between a first device and a second device, wherein the first device comprises a physical unclonable function (PUF) element, the method comprising, performed at the second device:
    generating a second part of a challenge value;
    signing the second part of the challenge for signature verification at the first device and transmitting the signed second part of the challenge to the first device;
    receiving an encryption of a response from the first device representing a use of the challenge as an input to the physical unclonable function element at the first device;
    decrypting the encrypted response;
    determining a predicted response to the challenge, and determining if the decrypted response sufficiently matches the predicted response;
    generating a symmetric key based on the decrypted response; and
    using the symmetric communication key for communication with the first device;
    wherein determining if the decrypted response sufficiently matches the predicted response comprises computing a similarity between a plurality of parts of the decrypted response and a corresponding plurality of parts of the predicted response.

2. The method of claim 1 further comprising receiving a first part of the challenge from the first device.

3. The method of claim 2 wherein receiving the first part comprises receiving an encryption of the first part, and decrypting the received encryption.

4. The method of claim 1 wherein determining a predicted response to the challenge includes applying a computational model corresponding to the physical unclonable function (PUF) element at the first device to the challenge.

5. The method of claim 4 further comprising receiving at the second device data characterizing the computation model of the PUF element.

6. The method of claim 5 further wherein receiving at the second device data characterizing the computation model comprises receiving an encryption of said data from the first device.

7. The method of claim 4 further wherein the computational model comprises a computation model of a circuit-based PUF.

8. The method of claim 7 wherein the circuit based PUF comprises a delay-based PUF.

9. The method of claim 4 further wherein the computational model comprises a computation model of biometric-based PUF.

10. The method of claim 1 wherein each part of the plurality of parts of each of the decrypted response and the predicted response is a one-bit part.

11. The method of claim 1 wherein signing the second part of the challenge comprises using a private key associated with the second device in a signing procedure.

12. The method of claim 11 wherein decrypting the encrypted response comprising using the private key associated with the second device in a decryption procedure.

13. The method of claim 1 wherein generating the second part of a challenge value comprises applying a random number generator in generating the second part of the challenge.

14. The method of claim 1 further comprising repeating all the steps of claim 1 with the same first device whereby on repetition the second part of the challenge and the decrypted response differ from prior repetitions.

15. A method for establishing a secure communication session between a first device and a second device, wherein the first device comprises a physical unclonable function (PUF) element, the method comprising:
    generating a first part of a challenge value at the first device, and generating a second part of the challenge value at the second device;
    exchanging the first part and the second part of the challenge between the first device and the second device, including signing the second part for signature verification at the first device;
    determining at the first device if the signed second part has a valid signature of the second device;
    using the challenge at the first device as an input to the physical unclonable function element to form a response that is characteristic to the first device;
    passing the response in an encrypted form to the second device;
    determining at the second device if the response passed from the first device sufficiently matches a predicted response of the unclonable function element; and
    separately generating a matching communication key at each of the first device and the second device based on the response of the physical unclonable function element;
    wherein determining at the second device if the response passed from the first device sufficiently matches the predicted response of the unclonable function element comprises computing a similarity between a plurality of parts of the response passed from the first device and a corresponding plurality of parts of the predicted response of the unclonable function element.

16. A second device for establishing a secure communication session with a first device and a second device, wherein the first device comprises a physical unclonable function (PUF) element, the second device comprising a processor and a circuit for implementing:
- a challenge generator configured to unpredictably generate second part of a challenge value;
- a signing module for signing the second part of the challenge for signature verification at the first device;
- an interface for transmitting the signed second part of the challenge to the first device, receiving an encryption of a first part of the challenge, and receiving an encryption of a response from the first device representing a use of the challenge as an input to the physical unclonable function element at the first device;
- a decryption module for decrypting the first part of the challenge, and decrypting the encrypted response;
- a prediction module configured to determine a predicted response to the challenge;
- a response verification module for accepting the decrypted response from the decryption module and the predicted response from the prediction module and determine if the decrypted response sufficiently matches the predicted response;
- a key generator configured to generate a symmetric key based on the decrypted response; and
- a communication module configured to use the symmetric key for cryptographic processing of communication with the first device;
- wherein determining if the decrypted response sufficiently matches the predicted response comprises computing a similarity between a plurality of parts of the decrypted response and a corresponding plurality of parts of the predicted response.

* * * * *